(12) United States Patent
Cavanagh

(10) Patent No.: US 6,609,473 B1
(45) Date of Patent: Aug. 26, 2003

(54) HIGH SPEED MODULAR SEA BASE

(75) Inventor: Richard A. Cavanagh, Panama City, FL (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/156,680

(22) Filed: May 29, 2002

(51) Int. Cl.[7] .................................................. B63B 1/34
(52) U.S. Cl. ...................................................... 114/67 R
(58) Field of Search ............................. 114/67 R, 230.1, 114/67 A, 264; 440/38, 3

(56) References Cited

U.S. PATENT DOCUMENTS

| | | | | |
|---|---|---|---|---|
| H1104 H | * | 9/1992 | Cavanagh | 442/111 |
| 5,632,141 A | * | 5/1997 | Sloop et al. | 60/782 |
| 6,151,882 A | * | 11/2000 | Cavanagh | 60/226.1 |
| 6,155,190 A | * | 12/2000 | Cavanagh | 114/45 |

* cited by examiner

Primary Examiner—Stephen Avila
(74) Attorney, Agent, or Firm—Harvey A. Gilbert; Donald G. Peck

(57) ABSTRACT

A high-speed modular platform has an upper level section having gas turbines on it for propulsion, and a lower level section has a lower periphery having a flexible skirt system connected to it to create an air cushion. Hollow struts extend between the upper level section and the lower level section. Each hollow strut is securely connected to the lower level section and has an opening communicating with a skirt volume inside of the flexible skirt system. Each hollow strut slideably engages the upper level section to permit sliding motion of the upper level section on the hollow struts toward and away from the lower level section. A gas turbine is connected to each of the hollow struts to vent, or force pressurized gas through them and create an air cushion with the flexible skirt system to enable high-speed transit over water and land surfaces and provide buoyancy.

16 Claims, 4 Drawing Sheets

HIGH SPEED MODULAR SEA BASE

STATEMENT OF GOVERNMENT INTERESTS

The invention described herein may be manufactured and used by or for the Government of the United States of America for governmental purposes without the payment of any royalties thereon or therefor.

BACKGROUND OF THE INVENTION

This invention relates to systems for transporting loads and setting up a remote facility for military or commercial use. More particularly, this invention relates to an air cushion transportable structure for high-speed transit over the water or land and deployment on land or anchored offshore.

Normal facilities such as warehouses, military/commercial staging areas, repair depots, and accommodations for personnel require a marine vessel or land-based real estate. Most ships have speeds of 20 to 30 knots and drafts that limit where they can be deployed, and land based in facilities are geographically constrained to one location.

The success of many military operations, especially against the terrorist threat, requires rapid response with significant logistical support. As history progresses, many countries are refusing to allow U.S. forces responding to a threat to stage from their territories. This requires the responding forces and logistical support for these forces to travel long distances from cooperating countries, or operate from distant conventional ships. The long distances that must be traveled restrict the ability to respond quickly to local events due to time-on-station limitations, as well as response time. Conventional ships require significant time to travel to the local area and respond.

Motel-like commercial accommodations require high construction costs and are restricted to one locale. When the market changes locale, costly new facilities must be constructed at a new location. When severe weather approaches, the fixed facilities are at risk from damage from winds, water, and flying debris.

Thus, in accordance with this inventive concept, a need has been recognized in the state of the art for a high speed marine platform that can transit to a distant site at high speeds in the range of 100–200 knots, anchor at the site, change its configuration to reduce the effects of motion by the sea, and create a stable base for operations.

OBJECTS AND SUMMARY OF THE INVENTION

An object of the invention is to provide a high-speed platform to travel to a remote site to create a stable base.

An object of the invention is to transport living and working quarters from one locale to another at speeds of 100 to 200 mph.

Another objective is to provide an operational base anchored in international waters to provide a military presence or facility.

Another objective is to permit commercial resorts to relocate dependent upon seasonal business, shifting markets, or weather.

Another objective is to provide a sea base having reduced reactionary motion to conditions of the sea.

Another objective is to provide a means of increasing the working load of a platform (gross-weight) by capturing air in the air cushion volume under a lower level structural member.

Another objective is to provide a working facility that can be relocated over land, swamp, marsh, or soft mud.

Another object of the invention is to provide an ocean going platform to travel at high speeds to a remote site, anchor, and change its configuration to create a stable base.

Another object of the invention is to provide a platform to travel at high speeds to a remote site and move portions of its hull a distance below the surface of the water to create a stable base.

Another object of the invention is to provide a platform to travel at high speeds to a remote site and move portions of its hull a distance and fill air in volumes associated with the portions below the surface of the water to create a stable base.

Another object of the invention is to provide a platform having a flexible skirt of a hovercraft for high-speed travel across water, beaches, and overland to a remote site to create a stable base.

Another object of the invention is to provide a platform having a flexible skirt of a hovercraft for high speed travel across water to a remote site where a lower level section is moved a distance below the surface of the water to create a stable base.

Another object of the invention is to provide a platform having a flexible skirt of a hovercraft for high speed travel across water to a remote site where a lower level section is moved a distance below the surface of the water and gas is filled in volumes associated with the lower level section below the surface of the water to create a stable base.

Another object of the invention is to provide a platform having a flexible skirt of a hovercraft for high speed travel across water to a remote site where a lower level section is moved a distance below the surface of the water and gas is filled in volumes associated with the flexible skirt below the surface of the water to create a stable base.

Another objective is to provide a capability to connect several modular platforms together to form different geometric shapes which increase the size of a facility.

Another objective is to connect several modular platforms together to form a landing strip for fixed wing aircraft.

These and other objects of the invention will become more readily apparent from the ensuing specification when taken in conjunction with the appended claims.

Accordingly, the present invention is to a modular platform having a flexible skirt of a hovercraft to travel at high speeds to a remote site, anchor, and change its configuration to create a stable base. The modular platform includes an upper level section having first gas turbines mounted on it for propulsion, and a lower level section has a lower periphery having a flexible skirt system connected to it to create an air cushion. Hollow struts extend between the upper level section and the lower level section. Each hollow strut is securely connected to the lower level section and has an opening communicating with a skirt volume inside of the flexible skirt system. Each hollow strut slideably engages the upper level section to permit sliding motion of the upper level section on the hollow struts toward and away from the lower level section. A second gas turbine is connected to each of the hollow struts to force pressurized gas through them to create an air cushion with the flexible skirt system to enable high-speed transit over water and land and provide buoyancy.

DESCRIPTION OF THE PREFFERED EMBODIMENTS

Figure 1:
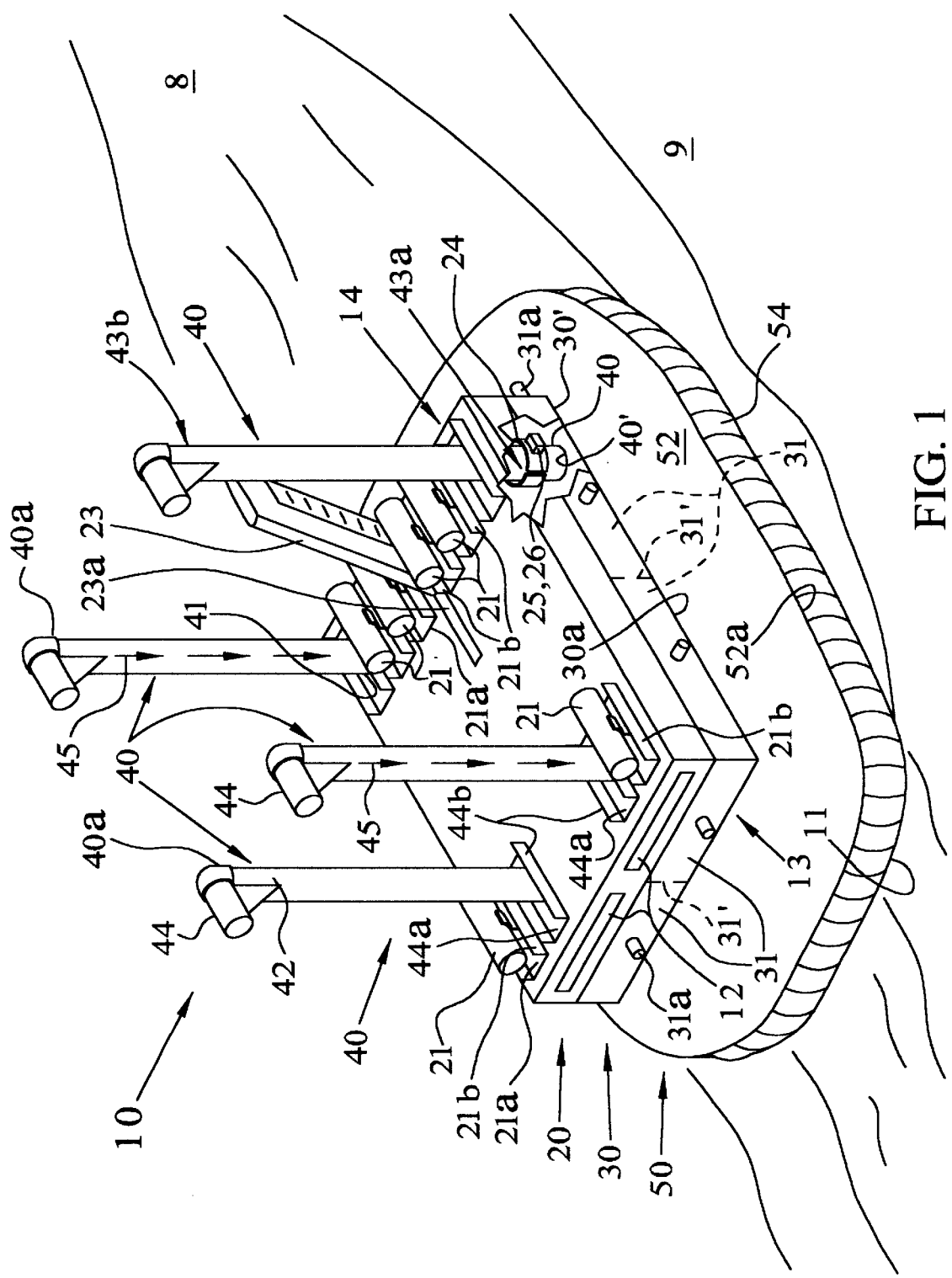
FIG. 1 is an isometric schematic view of the modular platform of the invention underway at high speed across water in a hovercraft mode.

Referring to FIG. 1, modular platform 10 of the invention is schematically shown speeding across surface 8 of open water 9 at high speed on a pressurized cushion of air, or air cushion 11. Windows 12 extend across a forward portion 13 of platform 10 and provide a good vantage point for a crew for safe high-speed transit to a destination. Modular platform 10 has an upper level section 20 and a lower level section 30 below and adjacent to upper level section 20. Hollow struts 40 extend through upper level section 20, to and through lower level section 30, and to flexible skirt system 50. Flexible skirt system 50 is connected to lower periphery 30' of lower level section 30.

Upper level section 20 is buoyant to float on surface 8 if the need should arise and contains the spaces for propulsive and support machinery, navigation, command and control, living for personnel, and work areas with equipment for tasks and operations. Gas turbines 21 can be a part of the propulsive machinery and extend above stowage bays 21a in upper level section 20 beneath an upper deck 22 and direct their thrust to the rear to propel platform 10 forward as depicted. After turbines propel platform 10 to a destined site, gas turbines 21 can be shut off and retracted below upper deck 22. Covers 21b for bays 21a can be rotated or slid shut to cover bays 21a and fit flush with and clear upper deck 22.

A vertical stabilizer-rudder 23 is mounted on an aft portion 14 of upper level section 20 and interacts with air flow and gas flow from turbines 21 over upper deck 22 to steer platform 10 as it transits at high speed. Different ones or combinations of turbines 21 can be turned up, turned down or put into reverse thrust relative to one another to aid vertical stabilizer-rudder 23 in the steering, maneuvering and station keeping of platform 10. Some or all of turbines 21 can be rotated about a vertical axis 21' for each turbine 21 to direct their thrusts in other than a rearward direction. In other words, selected ones of turbines 21 can be rotated about their respective vertical axis 21' to direct their thrust to push to either side or the rear to change the path taken by platform 10 or its orientation. Rotating turbines 21 to redirect their thrust is more effective at low speeds than steering with vertical stabilizer-rudder 23 and makes it easier to move froward portion 13, or bow of platform 10 around.

Figures 2A, 2B:
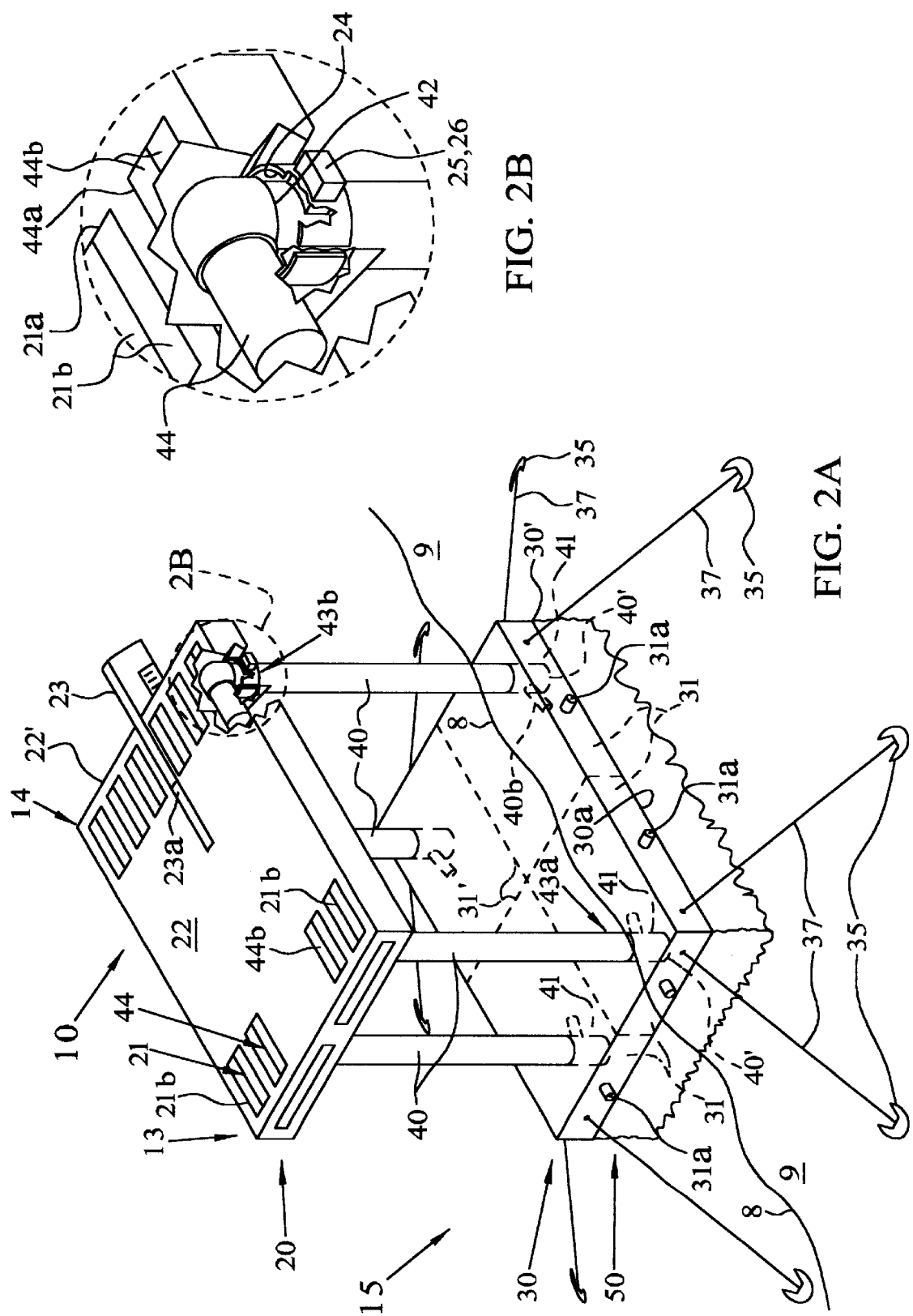
FIG. 2A is an isometric schematic view of the modular platform of the invention anchored with lower level section and deflated flexible skirt system displaced below the surface of the water to reduce reaction to surface wave action.
FIG. 2B is a magnified cross-sectional portion of the modular platform of FIG. 2A

After modular platform 10 of the invention arrives at its intended destination and it is oriented properly, vertical stabilizer-rudder 23 can be rotated ninety degrees in a stowage bay 23a in upper deck 22 to extend flush with upper deck 22 in a stowed position, see FIG. 2A. To prevent vertical stabilizer-rudder 23 from extending beyond periphery 22' of upper deck 22 where it could be damaged by an adjacent docking ship, for example, vertical stabilizer-rudder 23 could be slid toward forward portion 13 in an extended stowage bay 23a after it had been rotated, see FIG. 3. Then, a cover 23b could be closed to extend flush with and clear upper deck 22.

Lower level section 30 has walled-in compartments 31 formed by bulkheads 31' and sealed from ambient water 9 for storing materials and supplies and for selectively providing buoyancy and/or ballast for platform 10. This feature gives platform 10 considerable flexibility in performance and operational capabilities. During high-speed transit to a destination, compartments 31 can be evacuated of all non-essential fluids to reduce the weight of platform 10 to allow quicker deployment at higher speeds. Tubular valve fittings 31a in communication with compartments 31 provide for selective evacuation of water and other fluids including air and other gas from compartments 31 prior to transit, during, or at the destination of platform 10. Some of compartments 31 used for storage of fuel, petroleum products, materials, and supplies can be either flooded or completely evacuated too, or purged as needed.

Hollow struts 40 are secured connected at their lower end portions 41 to lower level section 30 and each extends through lower level section 30 to expose an opening 40' of virtually the same diameter as the inner diameter of each hollow strut 40. Each opening 40' is located at the bottom side 30a of each lower level section 30 and each hollow strut 40 extends through a separate cylindrical lateral passageway 24 that reaches across upper level section 20, see magnified cross-sectional portion of modular platform 10 of FIG. 2B. Each hollow strut 40 is tubular-shaped and has an outer diameter sized to slideably engage a separate one of lateral passageways 24 of upper level section 20. This slideable engagement of hollow struts 40 in lateral passageways 24 permits slideable displacement, or sliding motion of upper level section 20 on hollow struts 40 toward and away from lower level section 30.

Figure 3:
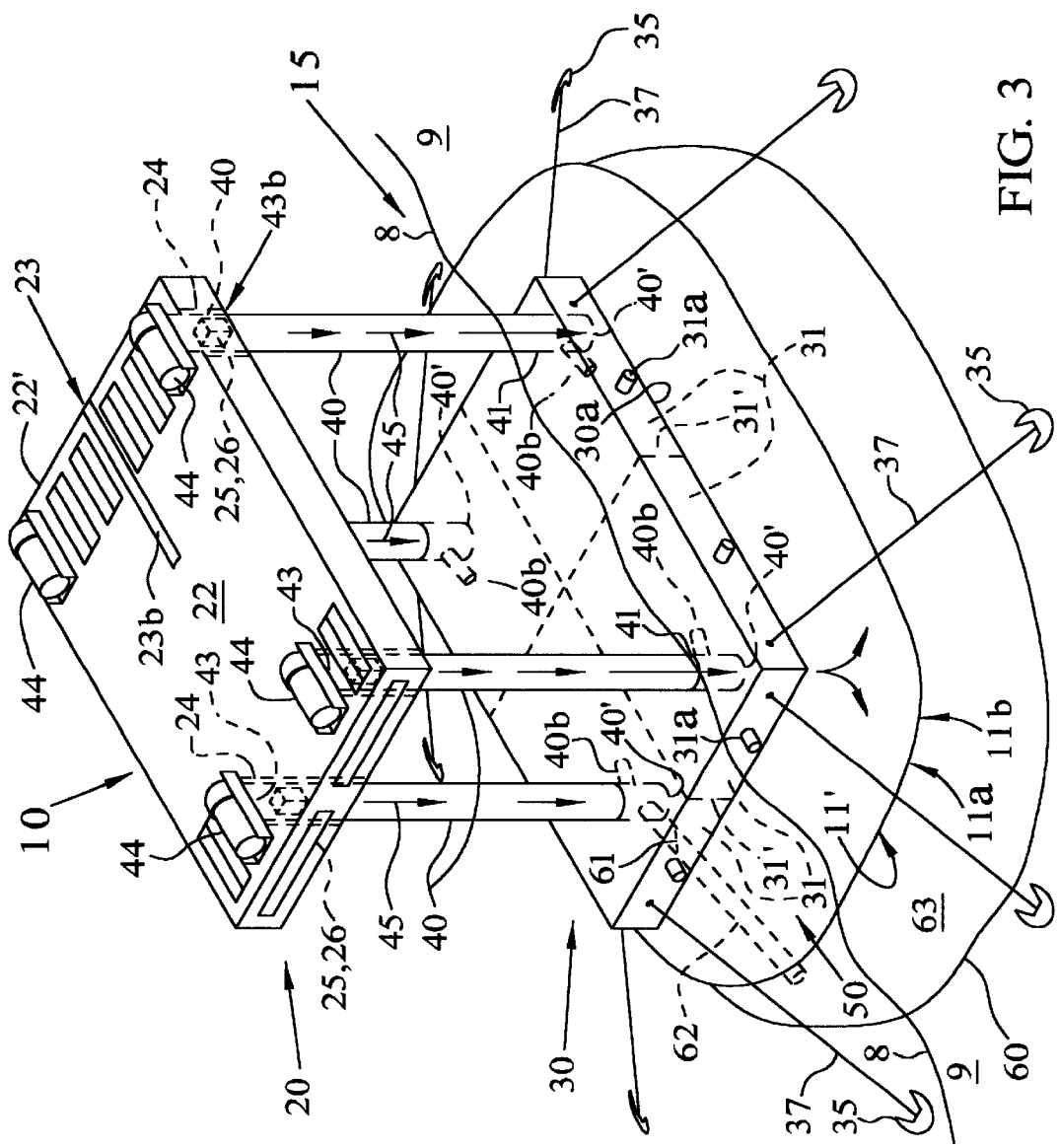
FIG. 3 is an isometric schematic view of the platform of the in ention anchored and having at least the flexible skirt at least partially filled with gas, or inflated to add buoyancy.

Suitable securing mechanisms 25 are mounted on upper level section 20 to securely engage each of hollow struts 40. These secure engagements at a first position 43a near lower end portion 41 on hollow struts 40 can hold hollow struts 40 high above water surface 8 and upper level section 20 adjacent to and on lower level section 30 during high speed transit as shown in FIG. 1. As shown in FIGS. 2 and 3, secure engagements can be made at a second position 43b on an upper end portion 42 on hollow struts 40 to hold most of hollow struts 40 and lower level section 30 immersed in water 9. Upper level section 20 is held spaced apart from lower level section 30 above surface 8 during operations in a littoral region. Anchors 35 can be set out as shown and anchor lines 37 extending from anchors 35 to lower level section 30 can hold platform 10 in place at a desired location and orientation in a littoral region. Intermediate engagements along the lengths of hollow struts 40 by securing mechanisms 25 can space upper and lower sections 20, 30 apart at different levels of separation to accommodate different depths, wind and water conditions, tactical situations, etc.

Each of hollow struts 40 has a gas turbine 44 connected to its upper end 40a. Turbines 44 supply and vent, or force sufficient volumes of pressurized gas (shown as arrows 45 in FIGS. 1 & 3) through hollow struts 40 and opening 40' on bottom side 30a of lower level section 30 to create and maintain air cushion 11 inside and below flexible skirt system 50 to support platform 10. Hollow struts 40 additionally have feeder ducts 40b to supply portions of pressurized gas 45 to compartments 31 in lower level section 30 for buoyancy purposes. Evacuation of water and other fluids from compartments 31 can be hastened by selectively feeding a portion of pressurized gases 45 from turbines 44, or other sources of compressed gas onboard platform 10 via feeder ducts 40b.

Gas turbines 44 can be same as turbines 21 and/or could be high-bypass jet engines to induce more ambient air into air cushion 11 to decrease the temperature of pressurized gas 45. Drawn-in ambient air and exhaust gasses of pressurized gas 45 are further cooled by passage through hollow struts 40 that extend through ambient water 9. The volumes of pressurized gas 45 are sufficient to create and maintain air cushion 11 and replenish any leakage of air cushion 11 while underway over water and/or land surfaces. Gas turbines 44 have more than enough capacity to create and maintain air cushion 11, and assure sufficient redundancy for continuous operations in case of inadvertent failure of one or more.

Flexible skirt system 50 on modular platform 10 is made to function in accordance with other contemporary hovercraft. Flexible skirt system 50 and gas turbines 44 create and support platform 10 on air cushion 11 for its high-speed transit to a designated site 15, and turbines 21 provide the propulsive force for the high-speed transit and can aid in steering. More or less of turbines 21 and 44 and hollow struts 40 could be included and located as needed. In addition, other units of centrifugal or mixed flow systems can be placed in virtually any arrangement to direct sufficient volumetric flows of pressurized gas 45 through hollow struts 40 to maintain air cushion 11, create buoyancy for platform 10, and purge compartments 31.

Flexible skirt system 50 can include a flexible skirt structure 52 secured along its entire length around the lower periphery 30' of lower level section 30 to contain air cushion 11 under modular platform 10. Flexible skirt system 50 optionally can have a flexible finger structure 54 secured on the bottom-side 52a of flexible skirt structure 52. Flexible finger structure 54 extends along the entire length of bottomside 52a to help contain air cushion 11 under modular platform 10 particularly when it traverses land surfaces. Flexible skirt structure 52 and flexible finger structure 54 can be made like many other skirt and finger structures currently utilized in contemporary hovercraft. The selected materials have sufficient strength, toughness, and flexibility to undergo repeated flexures when traversing over irregular surfaces, yet contain air cushion 11 to support hybrid craft 10 when traversing over water 9 and traveling overland.

Modular platform 10 could be modified to include rigid thin walled structure (not shown) that extends downward from lower periphery 30' of lower level section 30 instead of flexible skirt system 50. The rigid thin walled structure can be like the well known structures used on conventional surface effect crafts and would reduce drag and may permit higher speeds to be attained. However, rigid thin walled structure would prevent modular platform 10 from traversing shallow waters and surfaces overland since air cushion 11 could not be maintained by rigid walls like flexible skirt system 50 does.

Referring additionally to FIGS. 2 and 3, sufficient volumes of pressurized gases 45 are generated in turbines 44 and vented, or forced through openings 40' of hollow struts 40 at bottom surface 30a to assure creation and maintenance of air cushion 11 in skirt volume 11a below and inside of flexible skirt system 50. The thrust of turbines 21 can be efficiently utilized to quickly propel modular platform 11 at high speeds on air cushion 11, as well as aid in maneuvering platform 10. Thus, modular platform 10 is capable of speeds between 100 to 200 knots on an air cushion 11 to transport lower level section 30 and upper level section 20 to a deployment site 15.

Once on site 15 in littoral waters, anchors 35 and anchor lines 37 are deployed from lower level section 30 to bottom 7. Upper level section 20 disposed adjacent lower level section 30 should be separated to assure stability on surface 8 of water 9. The separation can be accomplished, or effected by flooding selective ones of compartments 31 in lower level section 30 with water via fittings 31a to ballast them. Then, lower level section 30 sinks to pull it and hollow struts 40 down below surface 8 in ambient water 9. Since upper level section 20 is buoyant, it is buoyed up to remain on surface 8 and slide up on hollow struts 40 from first position 43a on hollow struts 40 to second position 43b on hollow struts 40 (as depicted in FIGS. 2 and 3). Now, at least part of the flooded ballast water can be discharged, or blown from compartments 31 through fittings 31a by portions of pressurized gas 45 from turbines 44 vented through hollow struts 40 and feeder ducts 40b.

Optionally, four lifting mechanisms 26 can be connected to upper level section 20 to each engage the outer surface of a separate hollow strut 40. Lifting mechanism 26 can lift upper level section 20 upward and away from first position 43a on hollow struts 40 at lower level section 30 (as depicted in FIG. 1) to second position 43b (as depicted in FIGS. 2 and 3). Mechanisms 26 can work alone or in combination with the flooding and evacuation of compartments 31 to achieve the desired separation of upper level section 20 from lower level section 30.

Irrespective which way the separation is achieved, locating lower level section 30 in water 9 some distance below surface 8 and locating upper level section 20 some distance above surface wave action at surface 8 reduces the heaving, pitching and yawing responses of modular platform 10 to stabilize it. Surface wave action passes between them to reduce motion of platform 10. The reduced volumes occupied by hollow struts 40 at the water-air interface at surface 8 (as compared to sections 20 and 30) help provide a spar-buoy like reaction to surface wave action at surface 8 to further stabilize platform 10.

Modular platform 10 can increase its buoyancy to support greater loads on upper level section 20, such as those created by aircraft on cleared upper deck 22, for example. Compartments 31 can be evacuated of ballast water by ducting a portion of pressurized gases 45 from hollow struts 40 through feeder ducts 40b.

More buoyancy for modular platform 10 can be added when platform is anchored at site 15 and lower level section 30 and deflated flexible skirt system 50 are submerged below surface 8 of water 9, see FIG. 2. More of pressurized gas 45 (including ambient air) from turbines 44 are vented through hollow struts 40 and openings 40' at bottom surface 30a to create a bubble 11b within skirt volume 11a in flexible skirt structure 52 of flexible skirt system 50, see FIG. 3. Turbines 44 can be positioned above upper deck 22 to allow intake of air from the ambient. Skirt volume 11a was previously occupied by part of air cushion 11 during transit of platform 10 to site 15. The gases in bubble 11b in skirt volume 11a exert more buoying forces for platform 10 to increase its load bearing capacity so that heavier loads can be supported. Since platform 10 will have little motion, bubble 11a remains trapped inside skirt volume 11b.

Still more buoyancy could be added for platform 10 by including a supplemental buoyancy chamber 60 below flexible skirt system 50. Supplemental buoyancy chamber 60 could be a tough, flexible, rubber-bag-like structure that can be held in a deflated condition next to lower level section 30 during transit to site 15. Valve fitting 61 at an opening 40' diverts a portion of pressurized gas 45 through a feeder line 62 to inflate, or fill a bubble 63 in chamber 60 to the desired degree of extension. Bubble 63 being contained in chamber 60 has little risk of being unintentionally lost. After the need for this amount of added buoyancy passes, bubble 63 can be vented or deflated through fitting 61 to retract chamber 60 to the bottom of section 30.

Modular platform 10 of the invention is scalable, having dimensions of upper deck 22 ranging from about 25 by 25 feet to 400 by 400 feet, or even more. The size of modular platform 10 will determine the hover height, the height upper deck 22 is above water surface 8 when modular platform 10 is hovering, or supported on air cushion 11. Since the hover height is a function of the length and beam, a 48 foot wide platform 10 has a maximum hover height of about 9 feet, or about ⅕ the dimension of its beam. So, a 400-foot system could easily have a hover height of about 40 feet. Since hover height dictates the size of seas that the vehicle can operate in, a landing craft air cushion (LCAC) of the type of modular platform 10 having a hover height of 5 feet begins encountering high hydrodynamic drag when the seas are 3 to 5 feet (5 foot waves are encountered relatively frequently). Consequently, a large platform 10 having a 30-foot high flexible skirt system 50 should be able to operate fairly efficiently in 10-foot seas, making it capable for operation in the open ocean. Since turbines 21 and 44 are mounted up high on or above upper deck 22, the probability of them ingesting water is remote. Ingestion of water by propeller driven hovercraft usually dictates the highest seas that the vehicle can survive in.

Typically, LCACs of the type of platform 10 are designed to survive in a Sea State 5. A vehicle 400 feet in length/width should be able to ride out the severest of storms when on cushion. However, one of the major features of modular platform 10 is the ability to move at high speed, so it has the inherent capability to avoid heavy weather.

In addition to being able to anchor in relatively shallow waters usually found in near-shore, or littoral regions, modular platform 10 of the invention is capable of traversing solid earth, marshes, swamps, mud and soft beaches. After accessing these land areas via flexible skirt system 50, engines 44 are shut off and lower level section 30 settles to rest on the land surface and upper level section 20 may be raised via lifting mechanisms 26. The raised upper level section 20 helps provide security from local populace or environment and creates a secure base.

Figure 4:
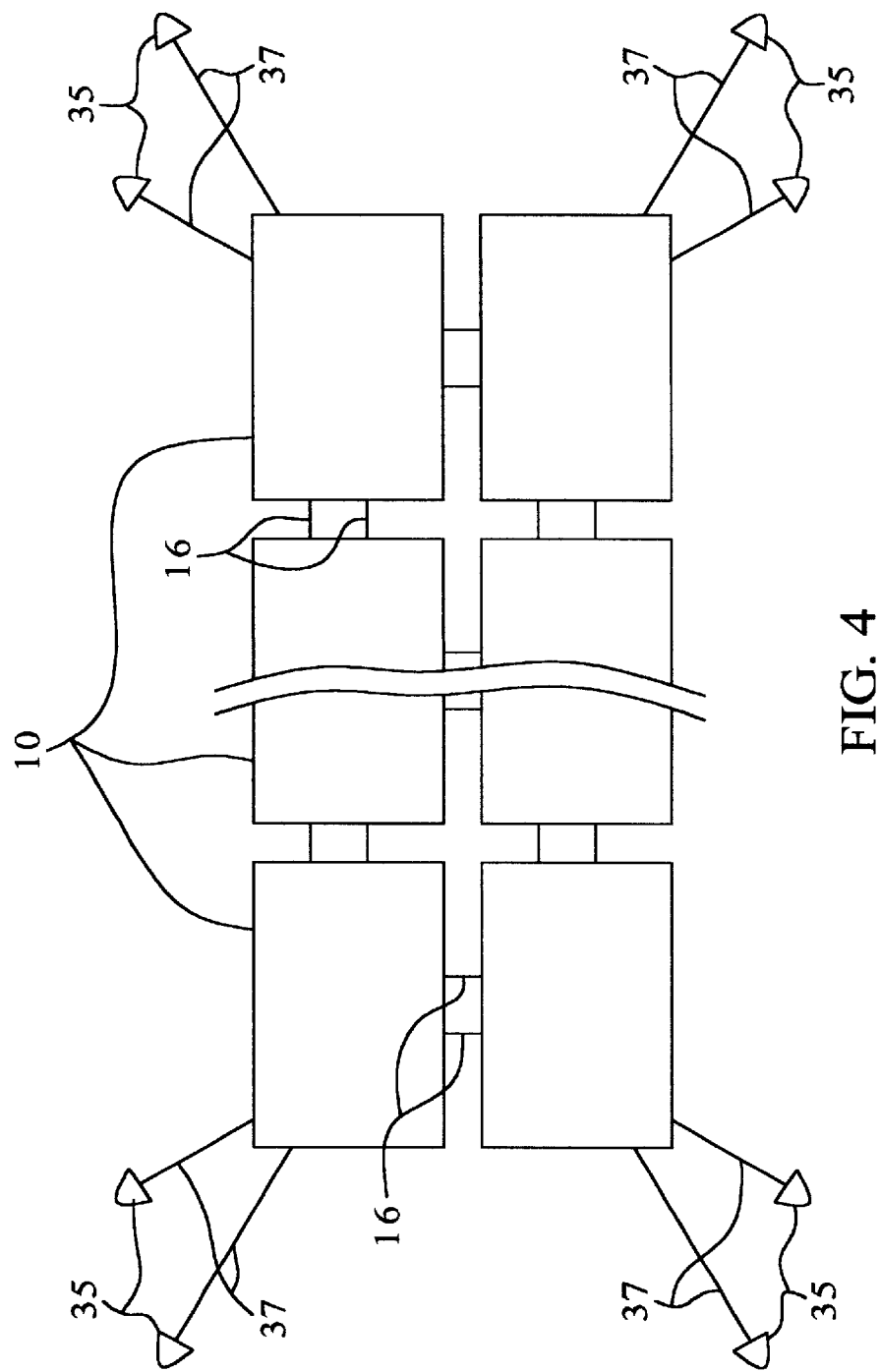
FIG. 4 schematically shows a top view several modular platforms of the invention connected together in an exemplary extended surface for aircraft.

Several modular platforms 10 can be used to create a landing pad for helicopters or as a landing strip for fixed wing aircraft on land or offshore, see FIG. 4. Other arrangements of modular platforms 10 can be made including square, circular-shaped, etc. having suitable passageways and conduits for power, communications, materials, etc. among them to accommodate a wide variety of military and commercial applications. Modular platforms 10 can be drawn together by various mechanical means and connected together by connector couplings 16 that may be flexible, rigid and/or combined with spacers to hold modular platforms 10 adjacent one another. For the purpose of showing couplings 16, FIG. 4 has modular platforms 10 separated, it being understood that in an operational setting, modular platforms 10 would be held together by couplings 16 in a contiguously abutting adjacent relationship. Connector couplings 16 can include various guides and mating structures to assure positive, precise close interconnections that withstand the effects of wind and waves. Anchors 35 and anchor lines 37 also can be used to help secure an interconnected landing strip, staging area or commercial facility offshore.

Different ones of the interconnected modular platforms 10 can hold fuel, supplies, provide accommodations and repair depots, or act as staging areas in different ones of upper level and/or lower level sections 20, 30.

When modular platforms are deployed individually or interconnected together, turbines 21 and 44 can be stowed below upper deck 22 in bays 21a and 44a and covered with covers 21b and 44b to clear upper deck 22 and allow it to serve as a landing platform for aircraft. Hangers or other shelters (not shown) can be built on upper deck 22. Other spaces in both upper level and lower level sections 20 and 30 can be used for hotel services, living quarters, supply warehousing, maintenance servicing, repair, or other functions. One or more modular platforms 10 connected together can be used as an island where helicopters, ships, boats, and, if large enough, fixed wing aircraft can interface.

Modular platform 10 can move to areas of high commercial interest as well as areas of high national interest. Upper level section 20 could have rooms for accommodations, banquets, dining, etc. or even a swimming pool while the support functions, e.g. kitchen, laundry, plumbing, etc. could be located in lower level section 30 that might have an undersea view port and a mini-marina for recreational boats. Stairwells/elevators could be included in hollow struts 40 for access.

Modular platform 10 of the invention quickly responds at high speed to a distant site. Since air cushion 11 of modular platform 10 produces a low drag, low displacement at high speeds, modular platform 10 is immune from being damaged by flotsam or causing severe damage to fish and mammals that it passes over. As speed of modular platform 10 increases, the displacement decreases, like speedboats. Therefore, at speeds in excess of 100 knots, the displacement of modular platform 10 is minimal and it skims surface 8 of water 9. At these speeds (100–200 knots), modular platform 10 will not be able to avoid whales, purposes, and fish just below the surface. However, since the rubber skirt and air cushion will pass over these "obstacles", the damage to either should be minimal. Thus, modular platform 10 of the invention provides high-speed transit at an environmental advantage over vessels which rely on water surface penetration for either buoyancy or propulsion. Conversely, the damage caused by impact with floating or semi-submerged objects, mammals, or fishes is eliminated in modular platform 10, while the damage has finite risk for other platforms which penetrate or extend into water 9.

Having the teachings of this invention in mind, modifications and alternate embodiments of modular platform 10 may be adapted without departing from the scope of the invention. Its uncomplicated, compact design that incorporates structures long proven to operate successfully lends itself to numerous modifications to permit its reliable use in hostile and demanding marine environments both on open water and over many different types of land mass, including but not limited to beaches, hard-pack, soft mud, marsh, tidal flats, etc. Modular platform 10 can be made larger or smaller in different shapes and fabricated from a wide variety of materials to assure resistance to corrosion, sufficient strength for heavy loads, and long term reliable operation under a multitude of different operational conditions and requirements.

The disclosed components and their arrangements as disclosed herein, all contribute to the novel features of this invention. Modular platform 10 provides a multipurpose and capable means of rapidly transporting personnel and materials to assure completion of assigned tasks irrespective of ambient conditions and terrain associated with hostile marine and land environments. Therefore, modular platform 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. A high-speed modular platform comprising:

an upper level section having machinery mounted thereon for propulsion;

a lower level section having a lower periphery;

a flexible skirt system connected to said lower periphery;

a plurality of hollow struts extending between said upper level section and said lower level section, each of said hollow struts being securely connected to said lower level section and having an opening communicating with a skirt volume inside of said flexible skirt system, and each of said hollow struts slideably engages said upper level section to permit sliding motion of said upper level section on said hollow struts toward and away from said lower level section; and a first gas turbine connected to each of said hollow struts to vent pressurized gas through them.

2. The modular platform of claim 1 wherein said pressurized gas is forced through said hollow struts to create an air cushion with said flexible skirt system to enable high-speed transit by second gas turbines of said propulsion machinery over water and land surfaces and to provide buoyancy.

3. The modular platform of claim 2 further comprising:

a vertical stabilizer-rudder mounted on said upper level section to enable steering and maneuvering; and stowage bays for said first and second gas turbines to stow said first and second said gas turbines below an upper deck of said upper level section.

4. The modular platform of claim 3 wherein said lower level section has compartments having tubular valve fittings to flood and ballast said lower level section to sink said lower level section and said hollow struts in said water, and said upper level section is buoyant to remain on said surface of said water and slide up on said hollow struts from a first position on said hollow struts to a second position on said hollow struts to separate said upper level section from said lower level section.

5. The modular platform of claim 4 further compromising:

a plurality of lifting mechanisms connected to said upper level section to each engage an outer surface of each of said hollow struts, said lifting mechanisms engaging said hollow struts to lift said upper level section upward and away from said lower level section.

6. The modular platform of claim 5 wherein said lifting mechanisms can work alone and in combination with said flooding of said compartments to achieve a desired separation of said upper level section and said lower level section.

7. The modular platform of claim 6 wherein said desired separation locates said lower level section in ambient water below said surface and locates said upper level section above surface wave action at said surface to reduce heaving, pitching and yawing responses.

8. The modular platform of claim 7 wherein said hollow struts have feeder ducts to supply a portion of said pressurized gas to said compartments of said lower level section, said compartments of said lower level section receives a portion of said pressurized gas vented from said hollow struts via feeder ducts to said compartments for buoyancy for said lower level section.

9. The modular platform of claim 8 wherein said lower level section has said tubular valve fittings in communication with said compartments to selectively evacuate fluids from said compartments.

10. The modular platform of claim 9 wherein a portion of said pressurized gas is fed through said feeder ducts as said fluids are being evacuated through said tubular fittings to hasten said evacuation of fluids from said compartments.

11. The modular platform of claim 10 wherein said upper level section has covers for said stowage bays to create a clear upper deck on said upper level section.

12. The modular platform of claim 11 wherein said flexible skirt system is comprised of a flexible skirt structure having a flexible finger structure on a bottom side of said flexible skirt structure.

13. The modular platform of claim 12 further comprising:

anchors connected to anchor lines extending to said lower level section to hold at a desired location and orientation in a littoral region.

14. The modular platform of claim 13 wherein said pressurized gas and ambient air from said first gas turbines are vented through said hollow struts and openings to create a bubble within skirt volume of said flexible skirt system to exert more buoying forces to increase load bearing capability.

15. The modular platform of claim 14 further comprising:

a separate flexible envelope below said flexible skirt system, said envelope receiving a portion of said pressurized gas through a feeder line to be inflated for increased buoyancy.

16. The modular platform of claim 15 wherein a plurality of said modular platforms are interconnected together to form a base for aircraft.

* * * * *